United States Patent [19]

Dieter

[11] Patent Number: 5,009,266
[45] Date of Patent: Apr. 23, 1991

[54] METHOD FOR IN SITU CONTAMINANT EXTRACTION FROM SOIL

[75] Inventor: Douglas K. Dieter, San Ramon, Calif.

[73] Assignees: Solvent Services, Inc.,, San Jose; Amit Nagpal, Monte Sereno, both of Calif. ; part interest to each

[21] Appl. No.: 394,391

[22] Filed: Aug. 15, 1989

[51] Int. Cl.$^5$ .................... E21B 43/24; E21B 43/30; E21B 43/34

[52] U.S. Cl. .................................. 166/245; 166/252; 166/272; 166/267

[58] Field of Search ............... 166/272, 303, 263, 252, 166/245

[56] References Cited

U.S. PATENT DOCUMENTS

| | | | |
|---|---|---|---|
| 3,483,730 | 12/1969 | Gilchrist et al. | 166/252 X |
| 3,913,671 | 10/1975 | Redford et al. | 166/272 X |
| 4,444,261 | 4/1984 | Islip | 166/272 |
| 4,593,760 | 6/1986 | Visser et al. | 166/267 |
| 4,635,720 | 1/1987 | Chew | 166/245 |
| 4,660,639 | 4/1987 | Visser et al. | 166/267 |
| 4,730,672 | 3/1988 | Payne | 166/267 X |
| 4,832,122 | 5/1989 | Corey et al. | 166/272 |
| 4,844,156 | 7/1989 | Hesh | 166/263 |

OTHER PUBLICATIONS

Bennedsen et al., Pollution Engineering, Feb. 1987, pp. 66-68.
Crow et al., GWMR, Winter 1987, pp. 51-57.
Stewart et al., ASME Multiphase Transport in Porous Media, Dec. 1987, pp. 31-42.
Milne-Thomson, Theoretical Hydrodynamics, 4th Edition, 1960, p. 213.
D. K. Dieter, "A Field Pilot Study of Steam Injection and Vacuum Extraction In-Situ Soil Remediation", Master's Thesis, Mechanical Engineering, University of California, Berkeley, Dec. 1988.
Howard et al., "Theories of Hydraulic Fracturing", AIME 1970, pp. 11-23.

Primary Examiner—Stephen J. Novosad
Attorney, Agent, or Firm—Townsend and Townsend

[57] ABSTRACT

A method for the in situ removal of mobilizable contaminants, including volatile and semi-volatile organic compounds, from a contaminated unsaturated zone of primarily porous layers of soil, comprising pulsatilely injecting heated pressurized steam into a first location in the zone in order to heat the soil in the zone, and withdrawing the contaminants under subatmospheric pressure from the soil at a second location in the zone. In specific application, the pulsatile injection of steam is used to heat the soil without directly recovering injected steam for a significant period of time until the targeted soil in the zone is uniformly heated to steam temperature. The pulsatile injection directs the heat in particular directions and to particular areas in the soil zone as desired.

27 Claims, 4 Drawing Sheets

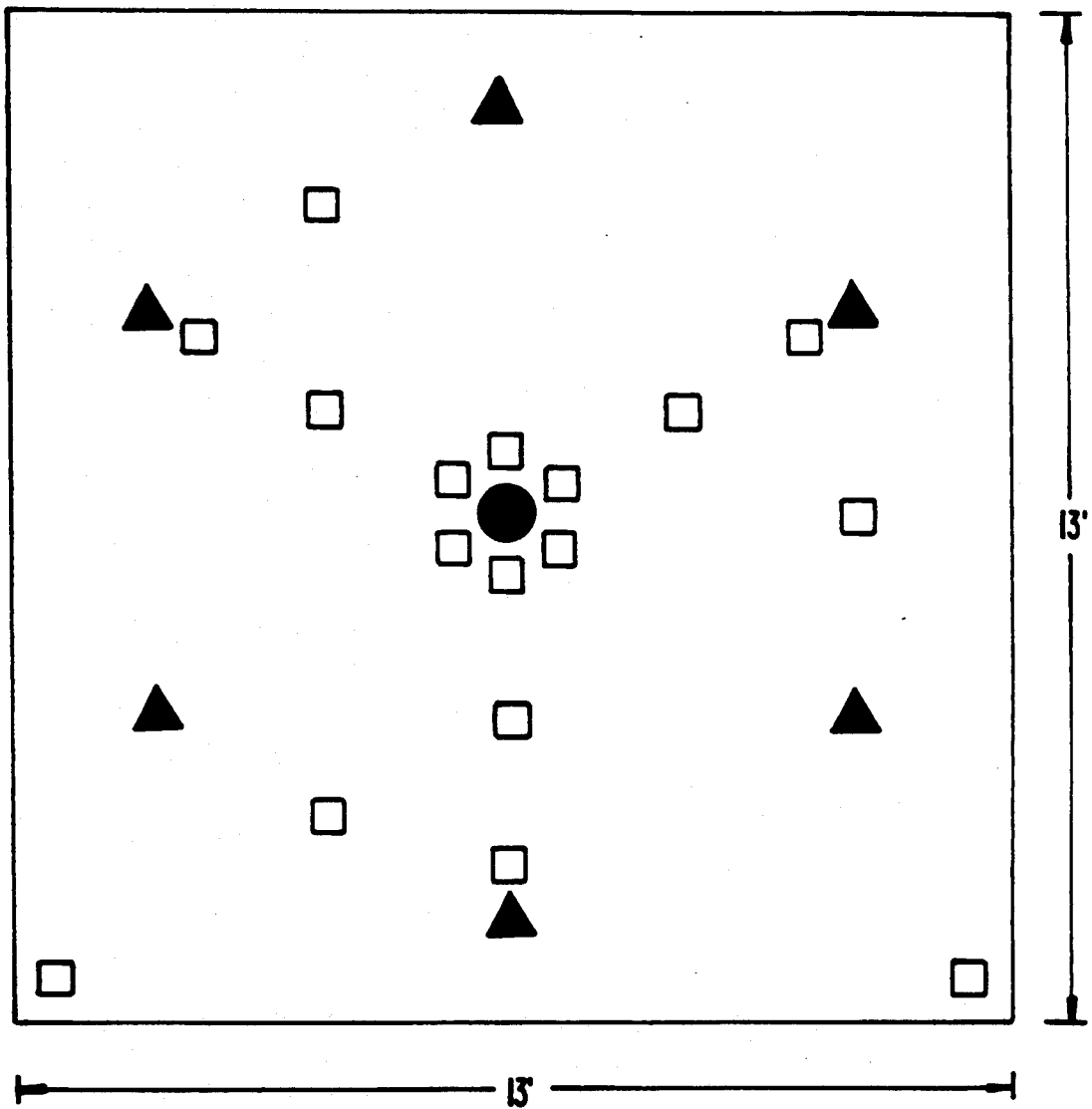
FIG._1.

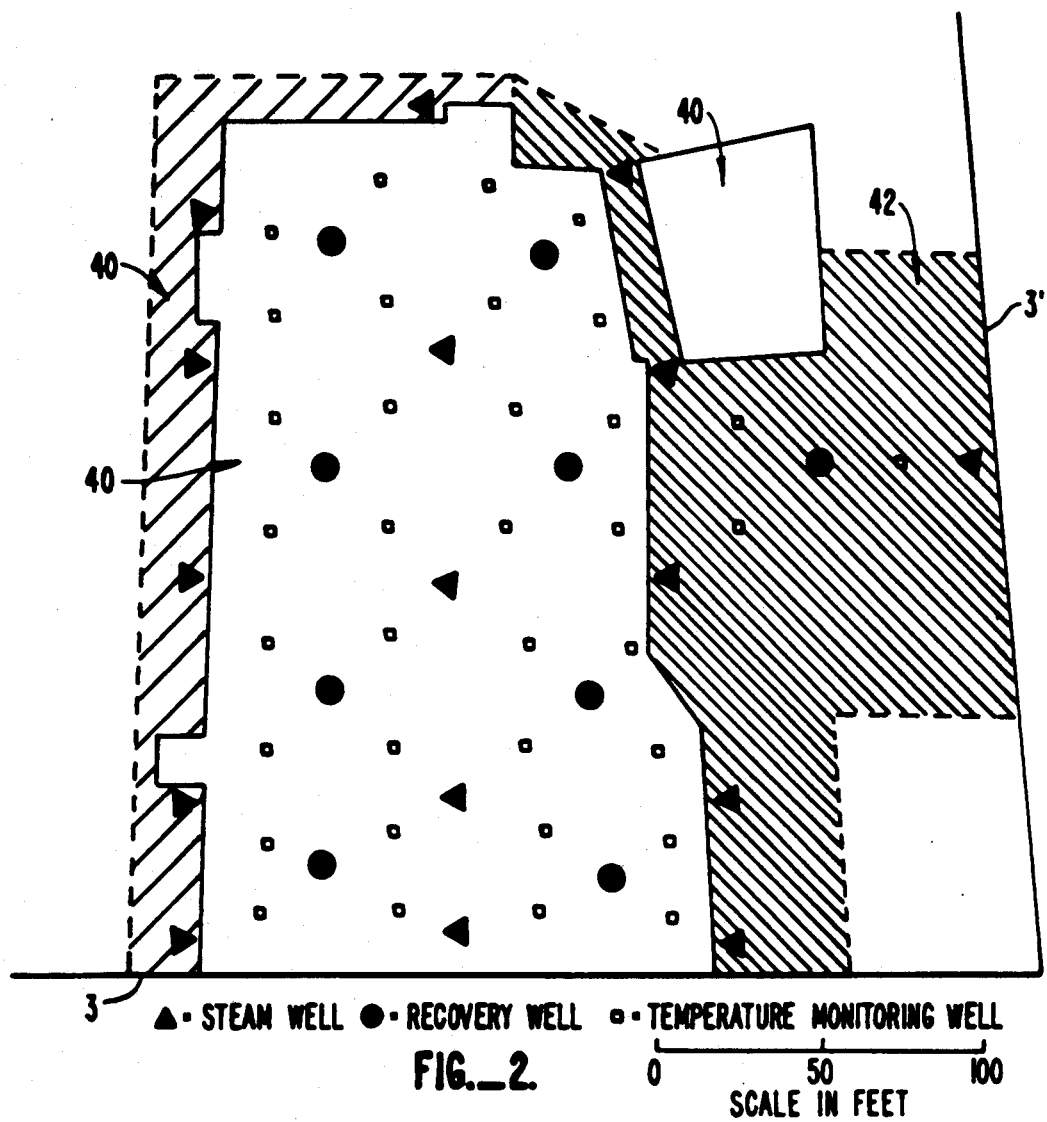
▲ = STEAM WELL  ● = RECOVERY WELL  ▫ = TEMPERATURE MONITORING WELL
FIG._2.
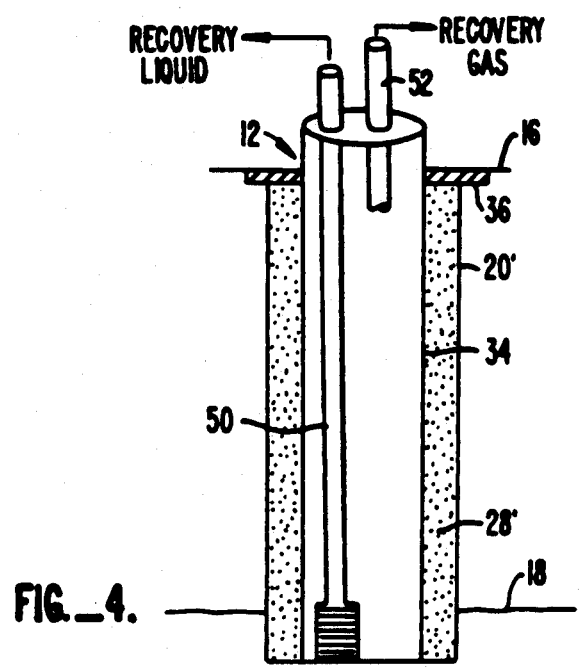
FIG._4.

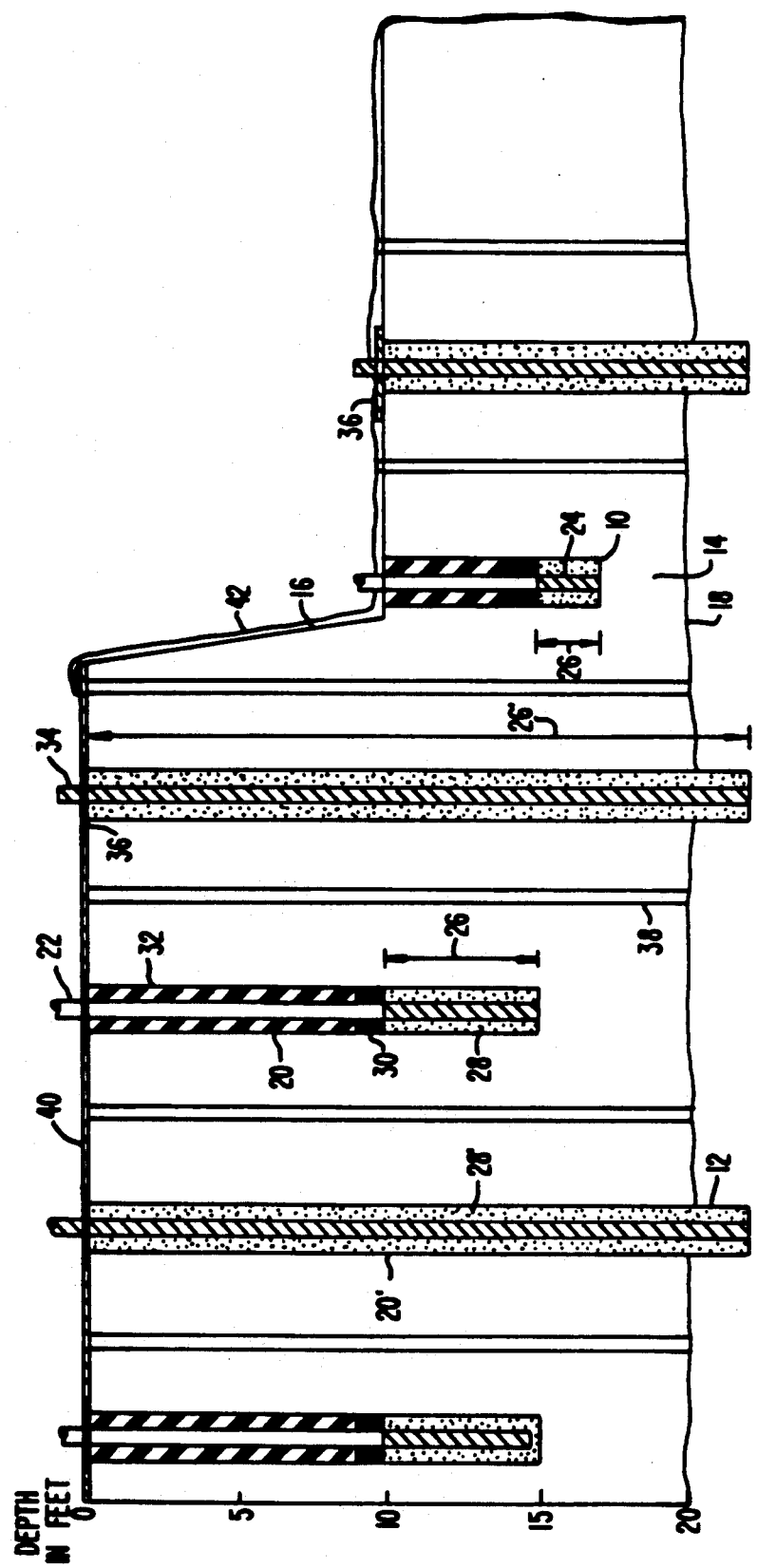

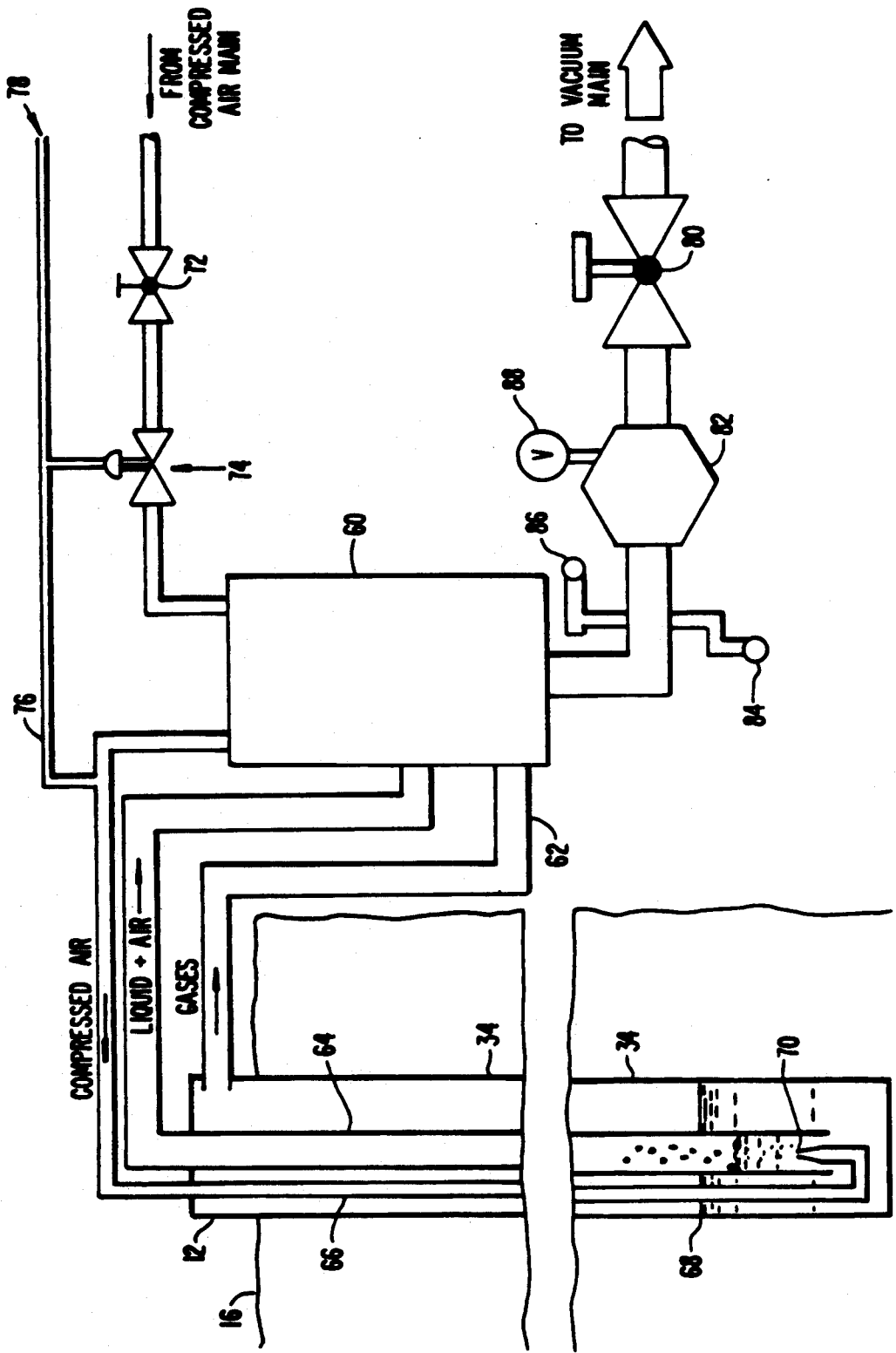
FIG._5.

METHOD FOR IN SITU CONTAMINANT EXTRACTION FROM SOIL

BACKGROUND OF THE INVENTION

This invention is related to methods for the in situ extraction of contaminants from soil, and in particular to such a method using steam injection and vacuum extraction.

Vacuum extraction of volatile organic compounds from soil has been successfully demonstrated and has become a popular remediation technique. See, Bennedsen, Feb. 1987, Pollution Engineering, pp. 66–68; Crow et al., Winter 1987, GWMR, pp. 51-57. The typical approach to vacuum extraction is to install a recovery well in the contaminated region and recover vadose zone gases by applying a sub-atmospheric pressure to the well. The sub-atmospheric pressure is sustained by a blower at the surface. The blower exhausts vapors to the atmosphere or to gaseous phase contaminant recovery equipment such as an activated carbon filter or a combustion chamber, depending on the contaminants or their concentrations.

Contaminant recovery rates depend on the contact between flowing air and the contaminants, as well as local gas concentrations. Local gas concentrations are dependent on diffusion and phase change processes. These, in turn, are dependent on local liquid and gaseous phase concentrations and concentration gradients, vapor pressures of the compounds, and heat transfer. At normal subsurface conditions, recovery rates can be low, which result in long treatment times because of the limiting effects of these mass transfer processes.

Steam heating has been used in the petroleum industry as a method to reduce the viscosity, and thereby increase the mobility, of crude oil in order to enhance its recovery from subsurface reservoirs. In order for steam to flow to recovery wells at the depths petroleum is commonly found, high pressures are required to overcome the hydrostatic pressure caused by the large amount of overlying water. The loss of steam flow control is a problem often encountered when injecting steam into deep reservoirs. The steam tends to migrate upward because of buoyancy effects rather than horizontally into the reservoir. This reduces the volume of the reservoir which is heated.

It is therefore desirable to increase the in situ recovery rates of contaminants in the soil while maintaining control of the recovery process, and to do so in a time- —and energy-efficient manner.

SUMMARY OF THE INVENTION

According to the invention, a method for the in situ removal of mobilizable contaminants, including volatile and semi-volatile organic compounds, from an unsaturated zone of primarily porous layers of soil comprises pulsatilely injecting heated pressurized steam for a significant period of time into a first location in the zone in order to heat the soil in the zone, and withdrawing the contaminants under subatmospheric pressure from the soil at a second location in the zone. In specific application, the pulsatile injection of steam is used to heat the soil without directly recovering injected steam for a significant period of time until the targeted soil in the zone is uniformly heated to steam temperature. The pulsatile injection directs the heat in particular directions and to particular areas in the soil zone as desired.

It has now been discovered that heating the soil creates conditions allowing for a dramatic increase in the rate of mass transfer utilizing vacuum extraction of mobilizable contaminants in soil. Vapor pressure increases exponentially with temperature, greatly increasing phase change rates of certain compounds, while some compounds may boil. The solubility of the vast majority of liquid contaminants dissolved in water is greatly reduced with an increase in temperature. Further the adsorption of contaminants to soil grains decreases at increased temperatures.

Injecting steam into soil has been found to be an efficient and economical way of supplying heat. Surprisingly, it has been found that when steam is injected at pressures slightly above atmospheric pressure into primarily unsaturated porous soil relatively close to the ground's surface, loss of steam flow control is not encountered. Additionally, the buoyancy effect is greatly reduced because any water generated by condensing steam will tend to drain downward by gravity. There are several features that make steam injection an attractive heating option. Heat is applied to water to form steam at the boiler, and the steam is then directed to the desired areas through piping and steam injection wells. Clean steam is an excellent heating fluid because of its inherent inertness and high heat of vaporization. Also, a stable steam condensation front can help in displacing the less volatile compounds that stay in the liquid phase. In accordance with the invention, these less volatile compounds are pushed to the recovery wells by the stable steam condensation front, where they can be removed. Further, the very high heat of vaporization of the steam is released, upon contact with cool soil, when it condenses. This keeps the amount of injection fluid needed to heat a given volume of soil to a minimum.

The method of the present invention requires one or more steam injection wells and vacuum recovery wells in proximity to each other.

DESCRIPTION OF THE DRAWINGS

FIG. 1 illustrates one embodiment of a field design showing the configuration of a vacuum recovery well, steam injection wells and temperature monitoring wells with relation to each other.

FIG. 2 illustrates a second and preferred embodiment of a field design showing the configuration of vacuum recovery wells, steam injection wells and temperature monitoring wells with relation to each other.

FIG. 3 is a cross-sectional view along line 3—3' in FIG. 2.

FIG. 4 illustrates one embodiment of a vacuum recovery well.

FIG. 5 illustrates a second and preferred embodiment a vacuum recovery well, and also illustrates the recovery well system in schematic.

DETAILED DESCRIPTION OF THE EMBODIMENTS

FIGS. 1 and 2 illustrate two configurations in which wells may be positioned according to the present invention. Generally, each vacuum recovery well is accompanied by one or more steam injection wells, preferably by at least two steam injection wells, and more preferably by three to six steam injection wells. Such a pattern may be repeated throughout the contaminated region, as illustrated in FIG. 2. For efficient and complete removal of the contaminants, it is important that two criteria be met in the field design. Specifically, the steam injection wells must be placed so as not to force contaminants outside the contaminated zone and into previously clean zones, and recovery wells must be placed so as to recover all mobile and subsequently mobilized contaminants by the process. The number, locations, size, depth and completion details of these wells require assessment of the specific site to be treated, including size of the site, amount and types of contaminants, and soil type(s), for example. Estimated flow rates for air and steam are determined by well size, spacing, and injection and recovery pressures. The estimated time required for heating and cleaning the soil is determined by flow rates and by balancing steam energy input with soil energy gain.

FIG. 3 illustrates in cross-sectional view the placement of the wells in the soil zone and also in relation to each other. Steam injection wells 10, for the pulsatile injection of steam, and vacuum recovery wells 12, for the withdrawal of contaminants, are positioned in a zone 14 of unsaturated porous soil which is relatively close to the surface 16 of the ground. The zone is usually bounded below by a saturated or impermeable layer 18, such as clay, water or saturated soil. However, the application of the process of the present invention does not require this boundary to be present. Additionally, the process may be used to decontaminate a zone that is initially in a saturated zone, by dewatering the contaminated zone and then vaporizing and displacing contaminants to the recovery well or wells.

The steam well 10 is preferably although not necessarily drilled to a depth at or above the lower boundary of the contaminated zone 14. If a saturated or impermeable boundary 18 is present, the steam well 10 is preferably although not necessarily drilled to a depth in the zone 14 at or above the top of the layer 18. More preferably the steam well 10 is drilled to a depth above the saturated or impermeable layer to allow for draining of condensate. The borehole 20 of the well is of a diameter larger than the diameter of a steam pipe 22. Steam pipe 22 is placed in the well to a depth above the bottom of the borehole 20, and a tube of screening 24 extends from the pipe 22 to the bottom of the borehole. The screened interval 26, defined by the length of the tube of screening 24, should be of sufficient length to allow adequate space for steam flow into the soil. The top of the screening 24 is preferably located at the midway point between ground surface 16 and the layer 18, which spacing allows steam to be injected at pressures above one atmosphere, while still allowing sufficient space for steam flow. Gravel 28 or other stable but porous material is packed into the annular space between the wall of the borehole 20 and the screening 24 to provide stabilization to the sides of the borehole 20 while opening the soil zone to the screening 24. An impermeable seal 30 is placed above the gravel 28, and cement 32 may be poured around the steam pipe 22 from the seal 30 to the ground surface 16. The steam pipe 22 is connected in conventional manner to a boiler (not shown).

the vacuum recovery well 12 is preferably but not necessarily drilled to a depth in the contaminated zone 14 at or below the lower boundary of the zone 14. If a saturated or impermeable boundary 18 is present, the vacuum recovery well 12 is preferably but not necessarily drilled to a depth in the zone 14 at or below the top of the layer 18. More preferably, the recovery well 12 is drilled to below the top of the saturated or impermeable layer 18 to allow for recovery of condensate which may have drained to the layer. The borehole 20' of the well is of a diameter larger than the diameter of a recovery casing 34. Recovery casing 34 is composed of a water- and gas-permeable material such as steel screening, and the screened interval 26' formed by the casing 34 preferably extends from the ground surface 16 to the bottom of the borehole 20' to achieve maximum fluid recovery efficiency. Gravel 28' or other stable but porous material is packed into the annular space between the wall of the borehole 20' and the casing 34 to provide stabilization to the sides of the borehole 20' while opening the soil zone to the casing 34. A cap 36 of impermeable material such as cement is placed over borehole 20' and around casing 34 at the ground surface 16. Casing 34 is connected to a means for retrieving gases and a means for retrieving liquids (see FIG. 4 and 5).

Temperature monitoring wells 38 may be installed to monitor the flow of steam and the areas of heat conduction in the zone 14. Each monitoring well comprises small diameter pipe which is placed into the ground the entire depth of the zone to be treated. A thermocouple (not shown) may be lowered down into the pipe to measure the temperature of the soil at various depths. The temperature monitoring wells are preferably placed between the steam injection wells 10 and the vacuum recovery wells 12. By monitoring the progress of heat conduction and convection in the soil, the amount of steam injected into the zone can be periodically increased and decreased in a pulsatile manner so that the zone is completely heated through using a minimum amount of steam.

Covering over the surface of the ground in the area to be treated, preferably with an impermeable barrier, is desirable to increase air and steam flow through the contaminated regions and to help insulate against heat losses, resulting in a savings of energy and time. For example, as illustrated in FIGS. 2 and 3, a covering of concrete 40 or of a heat-resistant plastic 42 may serve as an impermeable surface barrier.

Within recovery casing 34 are means for retrieving gases and means for retrieving liquids from the recovery well 12. Means for retrieving liquids may be, for example, a submersible or a jack pump 50, as illustrated in FIG. 4. The pump may be operated manually or it may be preferably operated automatically, such as by a switch that energizes the pump at pre-set time intervals and shuts off the pump when the load on the pump decreases, that is, when the switch senses the recovery well has been pumped dry. Means for retrieving gases may be a gas recovery pipe 52 (FIG. 4) at the top of recovery well 12, which gas recovery pipe is connected to a vacuum pump (not shown) in conventional manner.

Alternatively, the means for retrieving liquids may be combined with the means for retrieving gases, the combined means comprising a vacuum valve 60 (FIG. 5) on each vacuum recovery wellhead, the vacuum valve 60 being connected with a gas recovery pipe 62, a downhole pipe 64, and an air line 66. The gas pipe 62 is placed at the top of recovery well 12, while the downhole pipe 64 is placed near the bottom of the recovery well and below a liquid level 68. The air line 66 is situated such that an outlet 70 of the air line is placed within the lower end of downhole pipe 64. Vacuum valve 60 is also connected in conventional manner with an air compressor via a compressed air main (not shown) for providing compressed air to air line 66, and with a vacuum pump via a vacuum recovery main (not shown) for providing vacuum for removing gases and liquids from the recovery well 12. The compressed air function of the vacuum valve 60 may be controlled manually by a standard valve such as a ball valve 72 or automatically by an air operated valve 74. The vacuum function of the vacuum valve 60 may be controlled by a ball valve 80, and includes a flowmeter 82, a liquid sample port 84 and a gas sampling port 86. A portable pressure differential meter and vacuum gauge 88 can be connected to the flowmeter port for readings.

In operation, the vacuum valve 60 will switch vacuum from the top to the bottom of the recovery well 12, while simultaneously allowing atmospheric air to enter the headspace of the recovery well, and injecting compressed air into the downhole pipe 64 to lift any liquids from the bottom of the well. A bypass line 76 is connected to the air line 66 and is used to measure the depth of any liquid in the recovery well 12. A control signal line 78 connects a standard vacuum control (not shown) to the bypass line 76 and to the air operated valve 74.

In the practice of the present invention, vacuum is first initiated at the recovery wells 12, at which point the operational parameters may be measured and the equipment may be checked. This vacuum-only phase may continue for a period of a few hours or for up to two or three days or longer and may be non-constant due to adjustments. Then steam is injected into the steam injection wells 10. Steam is generated in a boiler, from which high quality steam is delivered to the injection wells 10 by way of a steam manifold. Steam is distributed through individual valves and flowmeters to the injection wells from the manifold, which is held at constant pressure by a pressure regulator. Pressure regulation is desired to protect the wells from over-pressuring should there be a loss of injectivity. The pressure entering each injection well is adjusted by adjusting the individual steam valve for that particular well while monitoring with the flowmeter. Because the steam injection wells are placed strategically, no further spreading out of contaminants will result. Air valves are present to allow for venting of the soil when the steam valves are closed. Also, air venting wells may be positioned in the soil zone at intervals to allow for a fresh air source at particular locations.

Steam is injected at rates and pressures specified by the design operational parameters, and its flow into the soil at various levels and distances is monitored by the temperature monitoring wells. Consistent monitoring of the location of the steam is maintained, by measurement of the temperature gradients in the soil at the monitoring wells, and adjustments in the steam injection rates are made to keep steam, and therefore heat, flowing uniformly through the targeted soil zone. For example, if steam entering a recovery well is identified as coming from only one particular injection well, or if the steam and thus heat in the soil of only one area of the zone is undesirably advancing more quickly than in the other areas, the flow of steam from that specific steam well or wells in the area is reduced or shut off, and later increased again when the steam and heat from the other injection wells have advanced appropriately. Also, such pulsatile injection of steam may be necessary to allow even soil heating in all directions; that is, the heat released by the condensing steam moves into all areas of the targeted soil zone, by conduction as well as by convection, creating a more effective and complete distribution of heat. Such pulsatile injection of steam may be effected by intermittent injection for varying periods of time or by injection at a regular, periodically recurring interval. The steam front then moves forward in a more uniform manner, and recovery of contaminants is quicker and more complete. The pulsatile injection of steam also provides a more efficient operation of the invention by reducing or eliminating the waste of heat and of recovery time. It is therefore not desirable to allow injected steam to enter and be recovered by the recovery wells for a significant period of time until the targeted soil in the zone has been uniformly heated to steam temperature. In other words, while some steam may break out into a recovery well prior to the targeted soil being uniformly heated, once it is determined which injection well the steam is coming from, the flow from that injection well is quickly reduced or shut off for a period of time and steam is no longer produced in the recovery well. Once there is uniform heating, the recovery wells are allowed to recover injection well steam directly. This direct steaming stage is continued for a significant period of time until concentrations of recovered gases drop off to a large extent from the initial direct steaming concentrations. At this point, the steam wells are shut off and interstitial water in the soil is allowed to vaporize, while maintaining vacuum recovery. Air valves and/or air vents may be opened for a constant or non-constant source of fresh air into the soil. This assists in driving out contaminants from the areas of lower permeability while the areas dry out. Temperature monitoring is continued until the soil is cooled to the point when the benefits from the heat are not being realized. This complete cycle of steam heating and vacuum recovery may be repeated one or more times as necessary in order for the observed recovered concentrations of contaminants to fall to essentially zero, indicating that the soil has been cleaned.

At the recovery wells 12, gaseous contaminants and steam from the ground are drawn up the well from the soil by subatmospheric pressure from a blower. In one embodiment of the invention, the subatmospheric pressure is applied continuously and simultaneously with the injection of steam. However, this is not required for the practice of the invention. The subatmospheric pressure may be applied to the well cyclically or otherwise discontinuously or at times other than when steam is being injected. The removed contaminants are then recovered in conventional manner. For example, the gases flow through a condenser where condensibles are liquified, by air-chilling for example, into a separation tank and are then pumped out of the separation tank and into a wastewater tank. Noncondensible gases are sent through a carbon tank where contaminants are absorbed by an activated carbon filter before the cleaned air is vented to the atmosphere. After they have been saturated with contaminants, the carbon filters may be replaced or, alternatively, they may be regenerated with steam. The effluent from the regeneration process is recycled back into the recovery system. Liquids accumulated at the bottom of the recovery wells 12 are pumped out of the wells as required, by compressed air or an electric pump for example, and vacuumed along with the recovered gases to the separation tank and then pumped to the wastewater tank. The recovered liquids are held temporarily in the wastewater tank before being further treated, by a bio-treatment system for example, or sent to other facilities for treatment.

In the practice of the present invention, steam will tend to rise on its way from injection to recovery wells due to buoyancy forces, thus bypassing lower zones, unless it is controlled. It has been found that a horizontally propagating steam condensation front can be controlled with respect to gravity if viscous forces dominate over buoyancy forces. High injection rates and/or small well spacing will satisfy this criterion. However, the number of wells needed to uniformly cover an area with a given pattern is inversely proportional to the square of the distance between them, and since the cost of implementation is directly related to the number of wells, it is desirable to have a large well spacing, thus dictating high injection rates.

Injection rates are directly related to injection pressure. Higher injection pressures will give higher injection rates, but at a given soil depth, steam injection pressure is limited by the amount of overburden present due to the weight of the soil and other masses above. For a typical soil density of about 100 lbs/ft$^3$, exceeding the critical pressure of about 0.5 psi per foot of soil depth will lead to fluidizing of certain elements in and/or hydraulic fracturing of the soil. If fracturing or fluidizing occurs, most of the steam injected would flow in the low resistance paths created from the injection to the recovery wells, and thus the efficiency of the steam to heat and clean the formation would be dramatically reduced. Thus, it is necessary to balance this pressure limitation with the requirement for high injection rates, and this leads to a limit on how far apart the wells can be spaced. Well spacing is also determined by heat transfer and loss relationships.

The vacuum recovery rates are dependent on the vacuum pressure and the pressure gradient formed thereby. The pressure gradient is limited in that too great a vacuum drawn will create the problem of fluidizing elements in the soil. Normally, a vacuum of greater than 15 in. Hg will cause an unacceptably high pressure gradient.

A potential flow model relating injection rate to injection and recovery well pressures, pattern, spacing, injection interval, hole size, and soil and fluid properties has been developed by relating potential flow theory to compressible fluid flow in porous media. Potential flow theory was developed for incompressible, inviscid fluid flow and is discussed by L. M. Milne-Thomson, in "Theoretical Hydrodynamics", 4th Ed., Macmillan, N.Y., 1960. The utility of potential flow theory for compressible fluid flow in porous media is illustrated in detail by D. K. Dieter, "A Field Pilot Study of Steam Injection and Vacuum Extraction In-Situ Soil Remediation", Master's Thesis, Mechanical Engineering, University of California, Berkeley, December 1988.

For field design, it is important to know the amounts of fluids and contaminants that are expected to be produced in order to insure adequate capacity of treatment equipment such as condensers, wastewater pumps and tanks, and activated carbon filters. Thus, if steam is being injected into and contaminants recovered from an initially unsaturated soil zone, the rate and amount of liquid to be produced can be estimated by assuming that all steam injected is condensed and that there is continuity between mass injected and mass produced. Likewise, the rate of steam production can be estimated by assuming all steam injected is produced. The noncondensible gas flow can be estimated by Darcy's Law, since that rate is related to the recovery pressure. The maximum concentrations of contaminants expected to be found in the produced fluids can be calculated using known concentration values of each contaminant in the soil, as previously determined by analysis of soil samples, and equilibrium theory.

The method of the present invention is very efficient in removing contaminants from the soil because the system can be controlled by the pulsatile injection of steam to direct the heat in particular directions and to particular areas in the soil zone as desired. The system can be further controlled by the placement of the recovery and injection wells in the zone.

The method of the present invention is successful in removing mobilizable contaminants from primarily porous soil. "Mobilizable contaminants" as used herein in the specification and the claims refers to any contaminants of the soil that may be mobilized by steam injection and vacuum extraction. Such contaminants may include but are not limited to volatile and semi-volatile organic compounds. The present invention is particularly successful in removing volatile compounds from the soil, that is, those compounds having boiling points below steam temperature. Additionally, contaminant compounds with higher boiling points will be recovered at enhanced rates due to increased vapor pressures. For example, the vapor pressure of dichlorobenzene is increased forty times (40X), from 1 mm Hg to 40 mm Hg, when temperature is increased from 20° to 100° C.

The foregoing description is directed primarily to preferred embodiments and practices of the present invention. It will be readily apparent to those skilled in the art that further changes and modifications in the actual implementation of the concepts described herein can be made without departing from the spirit and scope of the invention as defined by the following claims.

What is claimed is:

1. A method for recovering mobilizable contaminants from a zone comprised primarily of porous layers of soil, said method comprising the steps of:
   (a) pulsatilely injecting heated pressurized steam into a first location in the zone so as to uniformly heat targeted soil in the zone to steam temperature forming a steam condensation front encircling the zone of soil in the first location, and
   (b) withdrawing the contaminants under subatmospheric pressure from the soil at a second location in the zone below the first location.

2. A method according to claim 1 wherein pulsatile injection rate of the heated pressurized steam is regulated such that the steam is directly recovered from the second location in the zone for a significant period of time only after temperature of the targeted soil is uniformly heated to steam temperature.

3. A method according to claim 2 wherein the pulsatile injection rate is effected by intermittent injection of steam for varying periods of time.

4. A method according to claim 3 wherein the intermittent injection is determined by monitoring of temperature gradients in the soil.

5. A method according to claim 2 wherein the pulsatile injection rate is effected by injection of steam at a regular, periodically recurring interval.

6. A method according to claim 1 wherein said injecting step comprises heating the zone between the first location and the second location such that the steam forms a steam condensation front encircling the zone of the soil between the first location and the second location and further including the step of recovering the steam from the second location in the zone for a significant period of time only after temperature of the targeted soil in the zone is uniformly heated to steam temperature.

7. A method according to claim 1 wherein the mobilizable contaminants are selected from volatile and semi-volatile organic compounds.

8. A method for recovering mobilizable contaminants from a zone comprising primarily porous layers of soil, said method comprising the steps of:
(a) pulsatilely injecting heated-pressurized steam into a first location in the zone so as to uniformly heat targeted soil in the zone to steam temperature forming a steam condensation front encircling the zone of soil in the first location, while withdrawing the contaminants under subatmospheric pressure from the soil at a second location in the zone below the first location; and
(b) after temperature of the targeted soil is uniformly heated to steam temperature, continuously injecting heated pressurized steam into the first location in the zone, while withdrawing the steam and the contaminants under subatmospheric pressure from the soil at the second location.

9. A method according to claim 8 wherein pulsatile injection rate of the heated pressurized steam is regulated such that the steam is directly recovered from the second location in the zone for a significant period of time only after temperature of the targeted soil is uniformly heated to steam temperature.

10. A method according to claim 9 wherein the pulsatile injection rate is effected by intermittent injection of steam for varying periods of time.

11. A method according to claim 10 wherein the intermittent injection is determined by monitoring of temperature gradients in the soil.

12. A method according to claim 9 wherein the pulsatile injection rate is effected by injection of steam at a regular, periodically recurring interval.

13. A method according to claim 8 wherein said injecting step comprises heating the zone between the first location and the second location such that the steam forms a condensation front encircling the zone of soil between the first location and the second location and further including the step of recovering the steam from the second location in the zone for a significant period of time only after temperature of the targeted soil in the zone is uniformly heated to steam temperature.

14. A method according to claim 8 wherein the mobilizable contaminants are selected from volatile and semi-volatile organic compounds.

15. A method for recovering mobilizable contaminants from a contaminated zone comprising primarily porous layers of soil, said method comprising the steps of:
(a) positioning one or more vacuum recovery wells, each vacuum recovery well accompanied by one or more steam injection wells positioned above the vacuum recovery wells, in the zone;
(b) pulsatilely injecting heated pressurized steam into the steam injection wells so as to uniformly heat targeted soil in the zone to steam temperature forming a steam condensation front encircling the zone of soil above the vacuum recovery wells, while withdrawing the contaminants under subatmospheric pressure from the soil at the vacuum recovery well; and
(c) after temperature of the targeted soil is uniformly heated to steam temperature, continuously injecting heated pressurized steam into the steam injection wells, while withdrawing the steam and the contaminants under subatmospheric pressure from the soil at the vacuum recovery well.

16. A method according to claim 15 wherein pulsatile injection rate of the heated pressurized steam is regulated such that the steam is directly recovered from the vacuum recovery well for a significant period of time only after temperature of the targeted soil is uniformly heated to steam temperature.

17. A method according to claim 16 wherein the pulsatile injection rate is effected by intermittent injection of steam for varying periods of time.

18. A method according to claim 17 wherein the intermittent injection is determined by monitoring of temperature gradients in the soil.

19. A method according to claim 16 wherein the pulsatile injection rate is effected by injection of steam at a regular, periodically recurring interval.

20. A method according to claim 15 which further comprises positioning temperature monitoring wells in the zone.

21. A method according to claim 20 wherein the temperature monitoring wells are positioned in the zone between each vacuum recovery well and the steam injection wells accompanying the vacuum recovery well.

22. A method according to claim 15 wherein said injecting step comprises heating the zone between the first location and the second location such that the steam form a steam condensation front encircling the zone of soil between the first location and the second location and further including the step of recovering the steam from the second location in the zone for a significant period of time only after temperature of the targeted soil in the zone is uniformly heated to steam temperature.

23. A method according to claim 15 wherein the vacuum recovery well or wells and the steam injection wells are positioned in a symmetrical pattern.

24. A method according to claim 15 wherein the zone is surrounded around its perimeter with steam injection wells.

25. A method according to claim 23 wherein the zone is surrounded around its perimeter with steam injection wells.

26. A method according to claim 15 wherein each vacuum recovery well is accompanied by one to six steam injection wells.

27. A method according to claim 15 wherein the mobilizable contaminants are selected from volatile and semi-volatile organic compounds.

* * * * *